Nov. 10, 1964   R. W. ASTHEIMER ETAL   3,156,823
HORIZON SENSOR WITH REFLECTIVE OPTICS
Filed May 16, 1962

INVENTORS
ROBERT W. ASTHEIMER
HENRY F. PETERSSEN
BY

*Robert James Shortis*

ATTORNEY

United States Patent Office 3,156,823
Patented Nov. 10, 1964

3,156,823
HORIZON SENSOR WITH REFLECTIVE OPTICS
Robert W. Astheimer, Westport, and Henry F. Peterssen, Stamford, Conn., assignors to Barnes Engineering Company, Stamford, Conn., a corporation of Delaware
Filed May 16, 1962, Ser. No. 195,185
7 Claims. (Cl. 250—83.3)

This invention relates to improved horizon sensors. An important class of horizon sensors is one using a conical scan, that is to say one which scans a detector, commonly an infrared detector, in a cone across the earth's disc. A typical example of a common horizon sensor of this type is described and claimed in the patent to Merlen 3,020,407, February 6, 1962. In this horizon sensor the conical scan is produced by rotating a germanium prism the detector being located on the axis of rotation. The sensor also is provided with a reference signal generator which generates a pulse once or twice during a revolution. The pulses usually are at opposite ends of a predetermined axis when the vehicle is in desired attitude. The output of the detector is processed in electronic circuits which produce a signal that is zero if the rotational interval from one horizon crossing to the reference signal is equal to that from the reference signal to the other horizon crossing. As the present invention does not deal with the principles of conical scanning or with the electronic circuits used they will not be shown.

The ruggedness, reliability and accuracy of the Merlen horizon sensor has resulted in its extensive use in rockets, Mercury capsules and other space vehicles. Where the energy received from the disc of the particular body on which the horizon sensor is being used is adequate the Merlen sensor is very suitable and constitutes an effective, reliable and rugged instrument. It suffers, however, from the necessary limitation of refractive optics, namely losses in transmission of radiant energy. The losses are unavoidable and the total transmission may be less than 10 percent. Where the infrared radiation from the disc of a body on which the horizon sensor is used is sufficiently great this low transmission may not constitute a serious drawback. In fact the Merlen sensors are regularly used and have proven to be entirely adequate for their purpose.

Horizon sensors using a body such as the earth which has an atmosphere presents some problems. Cold clouds near the horizon and sharp temperature differences on the surface of the earth can produce spurious signals and other difficulties. These have been compensated for to some extent by rather complicated electronic circuits but it would be preferable if the horizon sensor were insensitive to such phenomena and, therefore, required no additional electronic complications.

An approach to the solution of this problem is described and claimed in the copending application of Kaufman, Serial No. 63,623, filed October 19, 1960, now Patent No. 3,118,063. This horizon sensor operates only on the radiation from the carbon dioxide constituent of the atmosphere. The sensor, of course, is completely blind to clouds and so a true and accurate horizon sensing results. Suitably selected radiation detectors and/or filters are used. However, the Kaufman application, just as the Merlen patent, describes a horizon sensor with dioptric optics. The Kaufman sensor is faced with the same optics problems, as the Merlen sensor, namely loss of transmission by refractive optics in the infrared. The problem, however, becomes more acute because the amount of energy available in the narrow band of emission of carbon dioxide is very much less than that which is radiated by the earth's surface generally. It is with improved optics of higher efficiency that the present invention deals.

Essentially in the present invention special catoptric optics are used which greatly increase the efficiency and permit satisfactory operation at low energy levels such as those emitted by the atmospheric carbon dioxide band. The present invention is not concerned broadly with reflective scanning. On the contrary a very particular type of organization is required for maximum practical effectiveness.

Essentially the optics comprise a converging mirror of the on-axis parabolic type and one or two plane mirrors. These mirrors are mounted in a rotating element, such as a drum, so that the principal ray of the scan is reflected along the optic axis of the condensing mirror. When only two mirrors are used the incoming radiation first strikes the condensing mirror. If three mirrors are used a plane mirror reflects the incoming radiation into the converging mirror. The detector, as in the Merlen sensor, is mounted on the axis of rotation of the drum and is also positioned on the optic axis of the system. This is effected by a plane mirror which receives the radiation from the converging mirror and turns it along the axis of rotation of the drum so that it strikes the detector and is imaged thereon. The relative advantages and disadvantages of a two mirror and three mirror system will be described below in conjunction with the more specific description of the invention.

It is possible to use simple mirrors in a rugged mount and a large entrance aperture can be obtained with corresponding high energy without excessive weight and in a compact mount which can easily be rotated. No special mirrors, such as off axis parabolas, are required and the optics permit with simple construction a system giving the maximum of sharp resolution on the detector. Optical quality is greatly increased over theoretically possible systems in which the principal ray does not pass through the optic axis of the system or in which this axis does not pass through the converging mirror.

The horizon sensors of the present invention have the important advantage, shared by the Merlen sensors, that they can be mounted flush in a vehicle skin or even under certain circumstances slightly behind an opening. This eliminates problems from excessive heating in the case of vehicles which are launched through the atmosphere by rocket power and minimizes the effect of high skin temperature which is also encountered in supersonic airplanes. It is not necessary for the optics to project beyond the skin of the vehicle and so no temporary protecting domes are needed which later have to be jettisoned. At the same time the present system is advantageous in that it utilizes effectively the opening in the vehicle skin or window therein. This latter point will be more clear after a description of the drawings and will be further dealt with below.

The description will be particularly in conjunction with the horizon sensor operating on the carbon dioxide emission band in the infrared. This is a field in which the improved optics of the present invention are particularly effective and present their greatest advantages. It should be understood that the invention is not limited to any particular infrared wavelength range and may even be used in the visible or, as in the case of certain celestial bodies which do not have a significant atmosphere, the ultraviolet where the Lyman $\alpha$ radiation at the horizon is utilized. The advantages of the present invention are less great in these fields but still constitute a highly efficient and practical instrument.

The invention will be described in greater detail in conjunction with the drawings in which.

Figure 1:
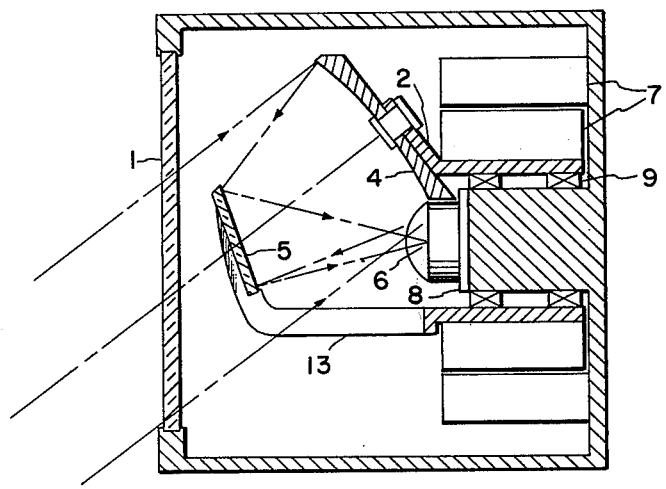
FIG. 1 is a cross-section through one modification of the invention.

In the modification illustrated in FIG. 1 the radiation enters a window 1 and strikes a tilted converging mirror 4 which may be an on-axis parabola. From the mirror the radiation strikes a plane mirror 5 which turns the radiation parallel to the axis of rotation of a rotating framework in which the mirrors are mounted. The characteristics of the converging mirrof and path-lengths result in imaging distant targets onto a detector 6 which is located on a boss 8 in the general framework of the sensor. This boss also supports bearings 9. As the framework 2 rotates a conical scan is produced, the angle of the cone being determined by the tilt of the converging mirror 4.

If desired the window could be eliminated providing merely an opening in the vehicle skin. It should be noted that the size of this opening is at a minimum compared to the entrance aperture of the optical system which is determined by the size of the mirror 4. The window 1 only has to be a little larger, for example by a factor equal to the square root of 2, and thus the smallest opening or window for given entrance aperture is achieved. This is a practical advantage which is difficult to achieve with refractive scanners such as the Merlen horizon sensor unless the germanium prism is located so close to the window as to present operating problems. It is always desirable to minimize the size of openings in a vehicle skin and in the case of high flying supersonic airplanes this presents another problem. The skin of the plane may be heated a good many hundred degrees above the temperature at which it is desired to maintain the horizon sensor mechanism. The smaller the opening or window the easier it is to keep the temperature of the horizon sensor at a desired moderate figure. Similarly the fact that the horizon sensor may be mounted entirely inside the vehicle eliminates any problems of protruding elements an important factor in space vehicles which have to be rocket launched at high speeds.

Figure 2:
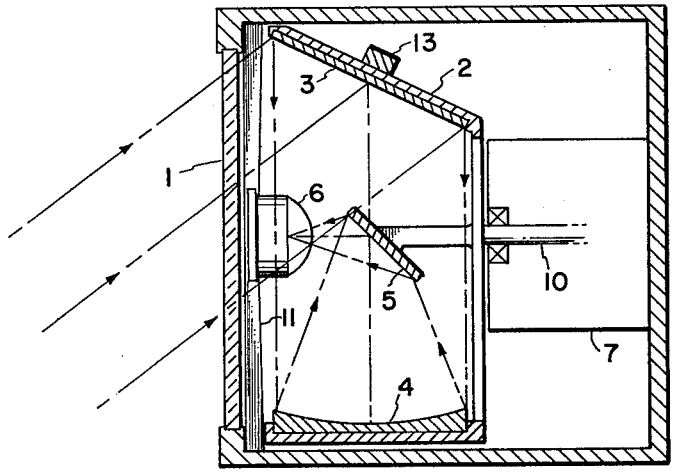
FIG. 2 is a cross-section through another modification.

FIG. 1 represents a rugged and simple structure with the minimum of reflecting elements, only two mirrors. For many purposes this design is preferable but for vehicles which must operate for long periods unattended in the vacuum of space the design presents some problems. A minor problem is the fact that the weight represented by the mirror 4 would be unbalanced and this makes an additional element necessary namely a counterweight 13 which, however, can be part of the bracket supporting mirror 5. A much more important problem is presented by the fact that the large boss 8 and with it the bearings 9 results in a fairly high speed of bearing elements. This presents a lubrication problem because in space many lubricants slowly volatilize. The problems of lubrication are more serious, the higher the moving speeds of the bearing elements and, therefore, it would be advantageous to reduce the speed of the elements in order to make the lubrication less of a problem. Such a construction is shown in FIG. 2 the same elements bearing the same reference numerals. In FIG. 2 the window and rotating drum shaped framework are the same. However, instead of the incoming radiation striking a converging mirror 4 it strikes a tilted plane mirror 3 and is reflected down to the converging mirror 4 which is now mounted flat on the inner drum surface. In order to reduce lubrication problems the large hollow shaft of FIG. 1 is replaced by a small solid shaft 10. Instead of mounting the detector in the center of the hollow shaft as is the case in FIG. 1 is it mounted on a spider 11 which is between the window 1 and the shaft 10. Of course, the folding mirror 5 has to be tilted in the opposite direction. The operation is the same as in FIG. 1 and the efficiency is substantially the same. The arms of the spider 11 obscure some radiation but it will be seen that in FIG. 1 there is a small portion of the mirror 4 cut out in order to accommodate the detector. The detector is shown as an immersed detector and, of course, the immersion lens is dioptric but an immersed detector has greatly increased sensitivity and so the increased efficiency of the reflective optics is fully preserved and in fact enhanced.

The angle of the conical scan is no different with the optics of the present invention than with standard Merlen horizon sensors. It is determined in accordance with other operating considerations. For example the Merlen sensor preferably utilizes a scanning cone of about 110°. A somewhat smaller angle is shown in FIGS. 1 and 2. The particular angle to be chosen depends on operating conditions. If the angle is too small the maximum distance from earth or other celestial discs is somewhat limited although still in the thousands of miles and so quite adequate for most satellite operations. Where extreme altitudes are to be encountered a larger angle of cone may be required. This is provided just as simply in the present invention as in a Merlen sensor. Of course, at the extreme with a cone of 180° angle, the almost unlimited altitude possibilities require the paying of some price. With a 180° cone, it is not readily practical to mount the sensor inside the vehicle skin, it may have to project. In most cases, therefore, somewhat smaller cone angles will constitute the best compromise. It is an advantage of the present invention that practically any scanning cone angle can be provided.

The detector has been shown diagrammatically but, of course, if it is to be used on the carbon dioxide radiation band it must be of suitable design so that it responds only to radiation in the narrow band around $15\mu$. The design, however, is not changed by the present invention and any suitable type of selective detector may be employed. The particular details of detector construction, therefore, form no part of the present invention and hence are not shown.

We claim:

1. In a conical scanning instrument comprising a radiation detector and means for successively imaging targets in a conical scan thereon the improvement which comprises,
    (a) a converging mirror and at least one plane mirror mounted in a framework capable of rotation about an axis,
    (b) a radiation detector mounted on the axis of framework rotation and the mirrors being positioned to image targets from a conical scan onto the detector, the optical axis of the mirrors at the detector corresponding with the axis of rotation, at least one of the mirrors being tilted with respect to the axis of rotation to produce the conical scan the angle of which is determined by the tilt of the mirror.

2. A conical scanning instrument according to claim 1 in which radiation from targets around the conical scan pass through a window transparent therefor said window being substantially at right angles to the axis of rotation of the framework and being of sufficient size so that the entrance pupil of the optic system is defined by the size of the converging mirror.

3. A conical scanning instrument according to claim 1 in which the converging mirror is tilted to produce the conical scan and a single plane mirror reflects radiation collected by the converging mirror onto the detector, the framework being mounted on a hollow sleeve and the detector being mounted fixedly in the center of the sleeve opening.

4. In a conical scanning instrument comprising a radiation detector and means for successively imaging targets in a conical scan thereon the improvement which comprises,
    (a) a plane mirror and a converging mirror mounted in a framework capable of rotation about an axis at right angles to the axis of the converging mirror,
    (b) reflective means which with the mirrors of (a) images targets on a radiation detector which is mounted both on the axis of rotation of the framework and the optical axis of the mirrors, (c) the first plane mirror being tilted with respect to the axis of rotation of the framework to produce a conical scan the angle of which is determined by the tilt of the mirror.

5. A conical scanning instrument according to claim 1 in which the detector is a selective infrared detector responding to the band of radiation from carbon dioxide at approximately $15\mu$.

6. A conical scanning instrument according to claim 4 in which the converging mirror is mounted on the inner surface of the rotating framework, the conical scan is produced by a tilted plane mirror and a second plane mirror imaging on the detector the radiation from the converging mirror to the detector thereby imaging the conical scan thereon.

7. A conical scanning mirror according to claim 6 in which the framework is mounted on a small solid shaft.

References Cited in the file of this patent

UNITED STATES PATENTS

| | | |
|---|---|---|
| 2,930,893 | Carpenter | Mar. 29, 1960 |
| 2,964,636 | Cary | Dec. 13, 1960 |
| 2,980,763 | Lasser | Apr. 18, 1961 |
| 3,004,162 | Menke | Oct. 10, 1961 |
| 3,020,407 | Merlen | Feb. 6, 1962 |
| 3,026,413 | Taylor | Mar. 20, 1962 |
| 3,064,924 | Fairbanks | Nov. 20, 1962 |